United States Patent Office 3,314,931
Patented Apr. 18, 1967

3,314,931
POLYMERIZATION IN NON-AQUEOUS SYSTEMS
Pauls Davis, Gibraltar, and Oskar E. H. Klopfer, Bloomfield Hills, Mich., assignors, by mesne assignments, to Continental Oil Company, Ponca City, Okla., a corporation of Delaware
No Drawing. Filed Mar. 6, 1961, Ser. No. 93,334
6 Claims. (Cl. 260—94.2)

This application is a continuation-in-part of our copending application S.N. 580,477, filed Apr. 25, 1956, and now abandoned.

This invention relates to polymerization in non-aqueous systems with the aid of metal-organic heterogeneous solid catalyst systems, and aims generally to improve and modify such polymerizations and the products obtained.

In part, the invention relates to the modulation of anhydrous heterogeneous catalyst polymerizations to produce various effects, e.g., regulation of molecular weight by a growth control or chain transfer agent, of non-aqueous rapid polymerization of polymerizable hydrocarbon material. Such polymerizations are effected with the aid of a metal-organic heterogeneous solid catalyst system that consists, at least in part, of a metal-organic compound and, at least in part, of a component insoluble in the liquid phase of the polymerization recipe.

Production of elastomers by mass polymerization of dienes, and/or olefins, and by copolymerization of dienes and vinyls, with the aid of metal-organic heterogeneous solid catalyst systems comprising portions that are soluble and insoluble in the liquid components of the recipe, such for example as the allyl-alkali metal solid catalyst systems and the like, of which the alfin systems may be cited as an example, is advantageous, inter alia, in the polymerization of butadiene to polybutadiene because of the consistently extremely short induction period and smoothness of the reaction. However, such operations involve the problem of the extreme high molecular weight of the polybutadiene product obtained, that requires addition of a considerable quantity of oil, e.g., petroleum oil, as an extender to bring the polymer into a usable Mooney viscosity range. This is accomplished only by time consuming or difficult procedures, and involves consequent reduction of ultimate tensile strength of the vulcanized elastomer, in order to obtain a polymer that can be worked with reasonable facility.

Although this problem has existed for many years, prior to the present invention those skilled in the art have had no method of controlling the molecular weights of polymeric materials produced by such polymerizations. The conventional means used in aqueous emulsion polymerization and in certain other types of mass polymerization to control molecular weight of the polymer produced, have not afforded to those skilled in the art any means or method for regulating the molecular weight of the polymer produced by the distinctly different mechanism ascribed to heterogeneous organo-metallic catalyst system polymerization, with its extreme rapidity of conversion of monomer material to high molecular weight polymer.

Among the objects of the invention, severally and interdependently, are the provision of methods of regulating such mass polymerization to effect control of the molecular weight of the polymer produced; the provision of methods for obtaining by such mass polymerization controlled molecular weight and easily processed polymers from monomers that in such mass polymerization ordinarily yield very high molecular weight polymers that are of high viscosity and difficult to process; and the provision of such methods particularly but not exclusively, applicable to the production of controlled molecular weight polymers by such mass polymerization.

Another object of the invention is the provision of means for regulating the polymerization of polymerizable hydrocarbon material employing a metal-organic heterogeneous solid catalyst system.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The invention resides in the new methods and provisions for regulating the mass polymerization with metal-organic heterogeneous solid catalysts, including the alkali metal-organic solid catalyst systems, and in the new and useful polymers obtained therefrom, and in the novel steps and sub-combinations of steps contributing to the foregoing objects, as hereinafter set forth, and as particularly defined in the appended claims.

As a result of the present invention, it has now been found that certain mercaptans, especially the tertiary alkyl mercaptans, certain halides, especially alkyl-, alkenyl, aryl- and aralkyl-halides; and certain other compounds, when added in small proportions after the monomers have been combined with the metal-organic heterogeneous solid catalyst system and before the polymerization has proceeded too far, are capable of acting as growth control or chain transfer agents in such polymerizations to yield polymers having special properties, e.g., sufficiently low molecular weight to be easily processed on the mill and to readily accept oil extenders when necessary. It has also been found that in some cases, when the catalyst does not react too rapidly with the growth control regulator, such regulator can be added with the monomer from the start. The other compounds referred to comprise peroxides such as di-ter-butyl peroxide, cumene hydroperoxide, etc., which are so inactive as initiators of polymerization as to be virtually ineffective for such purpose under the time and temperature conditions concerned, but which are shown to act as growth control or chain transfer agents when employed in accordance with the present invention.

The hydrocarbon monomers employed for forming the hydrocarbon polymers include dienes such as butadiene, isoprene, dimethyl butadiene, piperylene, other alkyl and aromatic dienes such as phenyl butadiene and the like; vinyl aromatic hydrocarbons such as styrene, alphamethyl styrene, the vinyl toluenes, the ethyl vinyl benzenes, vinyl napthalenes, vinyl alkyl napthalenes, other vinyl alkyl aromatics and the like; olefins such as ethylene, propylene, butylenes, amylenes, hexalenes, isobutylene, the isopentylenes, the isohexylenes and the like including other homologues thereof; and polymerizable cycloalkenes such as cyclopropene, cyclobutene, cyclopentadiene and derivatives thereof.

The class of polymerizations to which this invention pertains are the mass polymerizations wherein polymerizable hydrocarbon material containing ethylenic unsaturation is polymerized under anhydrous conditions with a metal-organic heterogenous catalyst system which is made up of at least two components selected from component groups (1), (2a), (2b) and (3) of which at least one component is selected from group (1) and at least one other component is selected from the other groups, wherein group (1) consists of metal-hydrocarbon compounds containing at least one metal atom attached to a hydrocarbon radical by a metal to carbon bond and the metal of which is selected from groups I to IV of the Periodic Table group (2a) consists of polar metal organic compounds containing metal from groups I to IV of the Periodic Table, combined with an alcohol, phenol, enol forming ketone, hydroxyether, hydroxythioether, mercaptan, mercaptoether, thiophenyl or amine, group (2b) consists of metal halide compounds, metal oxyhalide compounds and metal halide complexes of metal selected from the group consisting of copper, zinc, magnesium, boron, aluminum, gallium, titanium, zirconium, tin, antimony, bismuth, tellurium and iron, and group (3) consists of carrier materials selected from the class consisting of metals of groups I to IV and VIII of the Periodic Table, salts of such metals, oxides of such metals, hydroxides of such metals and carbon. The particular metal-organic heterogeneous solid catalyst system employed for the rapid formation of high molecular weight polymer from unsaturated hydrocarbons does not itself constitute the subject matter of the present invention, for this invention is concerned in its broader aspects with the provision of a method and means for regulating the polymerization with any such system to obtain a polymer of controlled molecular weight, and in narrower aspects, with the protection of the polymer regulating agent from reacting with certain of the metal-organic heterogeneous solid catalyst systems to form products non-useful to the polymerization reaction.

In the U.S. patent application, Ser. No. 580,642, filed Apr. 25, 1956, by Oskar E. H. Klopfer and Oliver W. Burke, Jr., entitled "Conjunctive Polymers, and Methods and Catalyst Systems for the Preparation Thereof," and now abandoned are described the metal-organic heterogeneous solid catalyst systems which are the ones which can be regulated when polymerizing unsaturated hydrocarbons according to this invention.

The metal-organic heterogeneous solid catalyst systems employed in this invention (sometimes called "solid catalysts" herein for brevity), many of which are new, per se, form a broad class of catalyst systems that contain three components which are (1) a metallated hydrocarbon compound, (2) a soluble metal-organic compound and (3) an active carrier including carriers which are formed by the reaction of (1) and (2) in part, and which three components are associated, complexed, or coordinated. The term soluble or insoluble used in connection with these components refers only to solubility or insolubility in diluents or monomers employed in the conjunctive mass polymerization.

Referring to the first of these three components, the soluble or insoluble metallated hydrocarbon compounds used in preparing the heterogeneous solid catalyst systems employed in this invention include compounds containing a metal-carbon bond, the metal of which is selected from groups I, II and III of Mendeléeff's Periodic Table as follows: from group I, lithium, sodium, potassium, copper, silver; from group II, beryllium, magnesium, calcium, strontium, zinc, cadmium, mercury; and from group III, boron and aluminum. The carbon of the metal-carbon bond is contained in a radical of hydrocarbon selected from the class comprising (a) radicals of the paraffinic type hydrocarbons such as methane, ethane, propane, butane, isobutane, pentane, the isopentanes, hexane, the isohexanes, etc.; (b) of the olefinic type hydrocarbons such as ethylene, propylene, the butenes, isobutenes, the pentenes, the isopentenes, the hexenes, the isohexenes, etc.; (c) of the cyclo-paraffinic and cyclo-olefinic hydrocarbon type such as cyclohexane and cyclohexene, methyl cyclohexane and methyl cyclohexene, isopropyl cyclohexane, isopropyl cyclohexene, terpenes, etc.; (d) of the aromatic type hydrocarbons, benzene, biphenyl, other polyphenyls, napthalenes, etc.; (e) of the paraffinic type hydrocarbons with aromatic substitutents including the above cited paraffins substituted with the above cited aromatics such as methylbenzene, ethylbenzene, isopropylbenzene, the alkyl polyphenyls, the alkyl napthalenes, etc.; (f) of the olefinic type hydrocarbons with aromatic substitutents including the olefinics above substituted with the aromatic above such as phenyl ethylene, isopropenylbenzene, alpha-methyl styrene, the poly-alpha-methyl styrenes including especially the di-, tri- and tetra-alpha-methyl styrenes, the vinyl toluenes, diphenyl ethylene, etc.; and (g) of acetylene and its homologues and the aromatic acetylenes, etc.

These metallated hydrocarbons may be prepared by any known method and process, including metallation of an aliphatic or aromatic hydrocarbon with less stable metal alkyls or metal aryls, or addition of such to unsaturated hydrocarbons, or addition of olefins to metal hydrides, or by careful reaction of organo halides with the metals or metal alloys or direct metallation especially of alkyl aromatics with metal-metal oxide mixtures, also with metal alloys, or direct metallation of dienes under closely watched conditions, obtaining the di-metallated dimer of the diene, etc.

When using polyvalent metals it is only necessary to form a metal compound with one or more of the hydrocarbon residues according to the valency of the metal; and the remainder of the metal bonds may be combined with hydrogen or halogen, e.g., the alkyl metal hydrides or the alkyl metal halides of polyvalent metals. For example, the substitution in an alkyl group or addition to a double bond may be accomplished by metallation with amyl sodium, zinc diethyl, aluminum triethyl, or the like; or substitution with alkali metals present, e.g., potassium metal-sodium oxide mixtures; substitution with Grignard compounds; and substitution of a polar group can be effected by treatment with the alkali metals per se, or their alloys. Organic compounds containing alkyl groups proximate to double bonds or aromatic rings are especially readily metallated.

In accordance with this invention, advantages can be obtained by producing the first component of the solid catalyst from compounds that can be multiply metallated to form conjoiners. When such multiply metallated hydrocarbons are used as components of the solid catalyst this will permit conjoint polymerization, that is, the initiation of two or more polymerization chains from the same metallated hydrocarbon. Thus, multiply metallated xylene, alpha-methyl styrene, trimer, alpha-methyl styrene tetramer, biotolyl, the polytolyls, tritolyl methane, the dimers, trimers and tetramers of the alkyl styrenes such as the vinyl toluenes, divinylbenzene, etc., can be employed as the metallated hydrocarbon compound of the catalyst and can directly produce conjunctive polymerizations. Furthermore, the metallatable hydrocarbon polymers like natural rubber, polyisoprene, polydimethylbutadiene, copolymers of butadiene with the vinyl toluenes, poly-alpha-methyl styrene, polyvinyl toluene, polybutylene, polyisobutylene, and the like can be metallated in a similar manner and can be employed as the metallated hydrocarbon component of the catalyst, in which case the metallated hydrocarbon polymer may itself constitute a segment or conjoining segment of the conjunctive polymer depending on whether it is singly or multiply metallated.

(2) The second of these components of the metal-organic heterogeneous solid catalyst system is a soluble metal compound consisting of (2a) soluble metal-organic polar compounds or (2b) soluble Friedel-Crafts compounds.

(2a) The soluble metal-organic polar compounds from which the heterogeneous solid catalysts of this invention can be formed include the metal-organic oxygen-, sulfur- and nitrogen-containing compounds from the metals of group I, II, III and IV of Mendeléeff's Periodic Table including from group I, lithium, sodium, potassium, copper, silver; from group II, beryllium, magnesium, calcium, strontium, zinc, cadmium and mercury; from group III, boron and aluminum; from group IV, titanium, zirconium, tin and lead; and such oxygen, sulfur and nitrogen compounds of these metals are restricted to combinations with alcohols, phenols, enol forming ketones, hydroxyethers, hydroxythioethers; mercaptans, mercaptoethers, thiophenols, the amines, the ether and thioether complexes of metal-organic compounds of the types $$MeR_x(R'OR'')_y$$

and MeR$_x$·(R'SR")$_y$ where Me is a metal of groups I, II, III and IV and R, R' and R" are the same or different hydrocarbon radicals.

(2b) The soluble Friedel-Crafts type compounds that may be used in preparing the heterogeneous solid catalyst systems employed in this invention include the halides, oxahalides, and halide complexes with halogen acids, of metals in groups I, II, III, IV V, VI and VIII of Mendeléeff's Periodic Table including from group I, copper, and from group II, zinc and magnesium, and from group III, boron, aluminum and gallium, and from group IV, titanium, zirconium, and tin, and from group V, antimony and bismuth, and from group VI, tellurium, and from group VIII, iron.

(3) The insoluble active carrier component for the heterogeneous solid catalyst systems employed in this invention includes certain metals and compounds of metals (when sufficiently finely divided) from groups I, II, III, IV, V, VI and VIII of Mendeléeff's Periodic Table including from group I, lithium, sodium, potassium, and copper; from group II, beryllium, magnesium, calcium, strontium, barium, zinc and cadmium; from group III, boron and aluminum; from group IV, silicon, titanium, zirconium and tin; from group V, vanadium, tantalum, antimony and bismuth; from group VI, chromium, molybdenum and tungsten; and from group VIII, iron and in special instances cobalt and nickel. The metals themselves can be employed as the carriers when sufficiently finely divided. The compounds of the metals that may be used include (a) salts of the aforecited metals with salt forming components selected from groups II, III, IV, V, VI, VII and VIII including from group II, zincates; from group III, borates and aluminates; from group IV, carbonates, silicates, titanates, zirconates, stannates, stannites, plumbates and plumbites; from group V, nitrates, nitrites, phosphates, phosphites, vanadates, arsenates, arsenites, antimonates and antimonites; from group VI, sulfates, sulfites, chromates, molybdates, tungstates, selenates and tellurates; from group VII, the halides, oxyacid halides and manganates; and from group VIII, ferrates, ferrites and complexes including those of cobalt and nickel. Such compounds further include (b) the hydroxides of the group Ia metals including from this group the hydroxides of lithium, sodium and potassium and (c) the oxides of groups I, II, III, IV, V, VI, VIII preferably in their lower state of oxidation, that is, from group I, lithium oxide, sodium oxide, potassium oxide and copper oxide; from group II, beryllium oxide, magnesium oxide, calcium oxide, strontium oxide, barium oxide, zinc oxide, cadmium oxide and mercury oxides; from group III, boron oxide, aluminum oxide and rare earth metal oxides; from group IV, silica, titanium oxide, zirconium oxide, tin oxides, thorium oxide and lead oxides; from group V, vanadium oxides, tantalum oxides, arsenic oxides, antimony oxide and bismuth oxide; from group VI, chromium oxide, molybdenum oxides and tungsten oxides; from group VIII, iron oxides, cobalt oxides and nickel oxides; and the mixed oxides of these same metals. Finally, the carrier may be carbon when sufficiently finely divided and the above carriers may be used singly or in combination, including coordinated combination, and as synthetic or naturally occurring minerals. This third component, the insoluble carrier, may be separately formed, or may be formed in situ, in whole or in part, from the combining of the first and second components of the catalyst systems. Thus, three component metal-organic heterogeneous solid catalyst systems may be prepared in the following manners:

(A) The solid catalyst may be formed from (1) a soluble metallated hydrocarbon compound plus (2) at least a compound selected from the class of soluble metal compounds consisting of the soluble metal-organic polar compounds and the soluble Friedel-Crafts compounds, in the presence of (3) an insoluble carrier.

(B) The solid catalyst may be formed from (1) a soluble metal-organic hydrocarbon compound plus at least (2) a compound selected from the class of soluble metal compounds consisting of the soluble metal-organic polar compounds and the soluble Friedel-Crafts compounds and with (3) at least a part of the combination of (1) and (2) itself becoming its own insoluble carrier.

(C) The solid catalyst may be formed from (1) an insoluble metallated hydrocarbon compound itself formed in the presence of (3) an insoluble carrier plus at least (2) a compound selected from the class of soluble metal compounds consisting of soluble metal-organic polar compounds and the soluble Friedel-Crafts compounds.

Examples are herein given to illustrate the practice of the invention, but will be preceded by brief descriptions of the preparations of typical metal-organic heterogeneous solid catalyst systems of the organo-alkali metal type, a brief description of typical procedures for effecting polymerizations with such solid catalysts with and without the procedures for regulating the polymer, and a brief description of a typical oil extending operation.

*Preparation of typical organo-alkali metal solid catalyst composition*

(1) An allyl-sodium heterogeneous catalyst composition, for example, may be prepared in any known way, but we prefer to prepare such a catalyst by a procedure in which (a) four gram atoms of alkali metal (e.g., 92 grams of sodium metal) are heated in about one liter of decane, up to 110–130° C. to melt the sodium, and vigorously stirred with a high speed agitator in the usual manner to disperse the sodium in finely divided form. Then the stirring speed is greatly reduced and the material cooled to room temperature. After settling, the decane is decanted, the sediment washed with pentane and then pentane is added to the sediment to form about one gallon, and cooled to about −10° to −18° C. Then (b) two moles of an amyl halide (e.g., 213 grams of amyl chloride) are added at this temperature under the same high speed stirring as before to produce the reaction

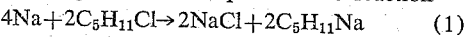
$$4Na + 2C_5H_{11}Cl \rightarrow 2NaCl + 2C_5H_{11}Na \quad (1)$$

after which the material is allowed to warm to room temperature. Then (c) one mole (102 grams) of dissopropyl ether is added with stirring, which is continued for about one hour, to produce reaction

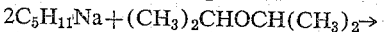
$$2C_5H_{11}Na + (CH_3)_2CHOCH(CH_3)_2 \rightarrow$$
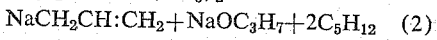
$$NaCH_2CH{:}CH_2 + NaOC_3H_7 + 2C_5H_{12} \quad (2)$$

The resulting catalyst suspension comprises about one mole of allyl-sodium, about one mole of sodium isopropoxide, and about two moles sodium chloride.

(2) Other saturated hydrocarbon solvents, such as butane, cyclopentane, hexane, or cyclohexane, may be employed in lieu of the pentane; and xylene, toluene or other high boiling hydrocarbon solvents may be used in lieu of the decane.

(3) Also if desired, the ratio between the allyl sodium, the sodium isopropoxide, and the sodium chloride may be altered. As one manner of varying such ratio, in step (c) any desired portion X of the two parts of amyl sodium may be reacted with a secondary alcohol such as isopropanol in the desired proportion to produce sodium secondary alkoxide (isopropoxide),

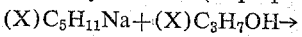
$$(X)C_5H_{11}Na + (X)C_3H_7OH \rightarrow$$
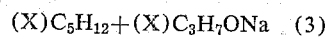
$$(X)C_5H_{12} + (X)C_3H_7ONa \quad (3)$$

and the remainder of the amyl sodium may then be reacted with propylene to produce allyl sodium, or with another olefinic hydrocarbon to form the corresponding alkenyl or cycloalkenyl sodium, viz:

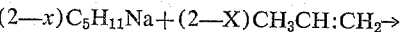
$$(2-x)C_5H_{11}Na + (2-X)CH_3CH{:}CH_2 \rightarrow$$
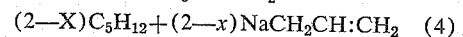
$$(2-X)C_5H_{12} + (2-x)NaCH_2CH{:}CH_2 \quad (4)$$

As a second manner of varying such ratio, in step (c) all of the amyl sodium may be converted to allyl sodium by reaction with propylene as in Equation 4, and thereafter any desired proportion (Y) of the allyl sodium may be converted to sodium secondary alkoxide (e.g., isopropoxide) by reaction with the appropriate quantity of secondary alcohol such as isopropanol, viz:

(Y)NaCH$_2$CH:CH$_2$+(Y)CH$_3$CHOHCH$_3$→
    (Y)CH$_3$CHONaCH$_3$+(Y)CH$_3$CH:CH$_2$   (5)

The catalyst suspension obtained by any of these procedures is stored in closed vessels, preferably for several days before using, and is agitated before use.

*Preparation of typical solid catalyst composition (other than alkali-metal)*

(4) A titanium tetrachloride-aluminum tri-ethyl heterogeneous catalyst composition comprising soluble and insoluble components was prepared as follows:

33 grams of tri-ethyl aluminum etherate (prepared by Grignard reaction and distilled) was dissolved in 1 liter of dry decane. To this solution was added 17 ml. of titanium-tetrachloride in an equal volume of decane. The dark reddish brown largely insoluble catalyst was formed at once with some heat generation, producing a heterogeneous catalyst suspension.

(5) A titanium tetrachloride-aluminum-tri-methyl complex was prepared in the same way as just described using 26 grams of tri-methylaluminum etherate instead of the 33 grams of tri-ethylaluminum etherate, and a similar catalyst composition was attained.

(6) The titanium-tetrachloride-aluminum tri-allyl heterogeneous catalyst composition is prepared in the same manner, using 40 grams of tri-allyl aluminum etherate instead of the tri-methyl aluminum etherate, and again a similar catalyst is obtained.

(7) A titanium tetrachloride-aluminum tri-ethyl heterogeneous catalyst composition with augmented insoluble component was prepared under 4, just above, 50 grams of finely ground cryolite (200 mesh). Such augmentation is known to adapt this catalyst for use with dienes for which the catalysts without augmented substrates are not suitable.

8. Substrate augmented titanium-tetrachloride aluminum tri-alkenyl catalysts are also obtainable by introducing the cryolite or other filler or substrate material into the solvent and forming the complex in its presence, in which event this complex is more uniformly distributed on the augmenting filler material.

TABLE A.—ILLUSTRATIVE SOLID CATALYST SYSTEMS USEFUL IN REGULATED MASS POLYMERIZATION

| No. | At Least Partially Soluble Component | At Least Partially Insoluble Component |
| --- | --- | --- |
| I | Aluminum triethyl | Titanium tetrachloride-aluminum triethyl complex. |
| II | ____do____ | Titanium tetrachloride-aluminum triethyl complex, Cryolite. |
| III | Aluminum trimethyl | Titanium tetrachloride-aluminum triethyl complex, Cryolite. |
| IV | Aluminum triallyl | Titanium tetrachloride-aluminum triethyl complex, zirconium chloride, Cryolite. |
| V | Sodium isopropoxide | Sodium, sodium allyl, sodium chloride. |
| VI | Potassium isopropenyl benzene, sodium butoxide. | Potassium, sodium chloride. |
| VII | Mixed potassium and sodium isopropoxide. | Potassium-sodium alloy, mixed potassium and sodium chloride, mixed potassium and sodium allyl. |
| VIII | Sodium isopropoxide | Sodium, amyl sodium, sodium chloride, carbon black. |
| IX | ____do____ | Sodium, octadecyl sodium. |
| X | Sodium isopropoxide, sodium naphthyl. | Sodium, silica. |
| XI | Zinc dimethyl | Zirconium chloride-boron trifluoride complex, zinc fluoride. |
| XII | Magnesium diethyl, lithium diethyl. | Ferric chloride, cupric oxychloride, sodium. |
| XIII | Boron trifluoride | Sodium hexyl, sodium chloride, zirconium chloride. |
| XIV | Diphenyl beryllium | Ethyl aluminum sesquichloride, titanium dioxide, aluminum triethyl. |
| XV | Aluminum triisobutyl | Vanadium tetrachloride. |

The metal-organic solid heterogeneous catalyst system prepared in each of these manners is kept under nitrogen (for illustrative examples of a few solid catalysts see Table A).

*Typical organo-alkali metal solid catalyst polymerization procedure used for controls*

In making the controls for the organo-alkali metal solid catalyst polymerizations of Tables I and II, an absolutely dry closable polymerization vessel (a cappable bottle) was charged with 250 ml. of dry pentane. Seventy-five ml. of heterogeneous catalyst suspension (herein that prepared by above described procedure 1) were added and evenly dispersed (by shaking). Then 70 grams of diene monomer, cooled to −20° C., were added, the bottle was capped, shaken for a short time until the start of polymerization was observed, and then allowed to stand quiescent for 30 minutes. The bottle was then opened and the residual catalyst was destroyed by passing the polymer through a meat grinder (a chopper, mixer and extruder) with an excess of isopropanol, after which 1% phenyl-beta-naphthalamine, based on monomers charged, was added in a final pass of the polymer through the grinder.

After drying to constant weight the conversion and the dilute solution viscosity (DSV) were determined. As indicated in the prior art, and confirmed by the control examples hereinafter set forth, the DSV of polymers produced by such procedure is very high, and lies within the range of from about 10 to 15 or more for polybutadiene.

*Typical organo-alkali metal solid catalyst polymerization procedure used for producing a regulated polymer*

The procedure employed in producing the regulated organo-alkali metal solid catalyst catalyzed polymer according to the present invention differs from that employed for producing the controls only in that the regulator employed is added after a part or all of the monomer has been charged and before the polymerization has proceeded too far, or alternatively, in the case of regulators not reacting too rapidly with the catalyst, in dilute concentration in the diene monomer being charged.

For batch polymerization in vessels, the regulator in all instances may be added with additional monomer after part of the monomer has been charged and initiation of polymerization thereof has become manifest and before the vessel is sealed, or may be injected into the sealed vessel before polymerization has proceeded too far; while in some instances, as noted, the regulator may be added concurrently with monomer when it does not react too rapidly with the catalyst.

Also any regulated polymerization herein exemplified in batchwise procedure can be effected continuously in suitable apparatus, for example, in the manner disclosed in the copending U.S. patent application of one of the present inventors, Oskar E. H. Klopfer, together with A. J. Kizer and O. W. Burke, Jr., Ser. No. 580,655, filed Apr. 25, 1956, entitled, "Continuous Polymerization Process and Apparatus."

It should be noted that the regulator should not be mixed or allowed to stand with the catalyst suspension, per se, but should only be added as above specified (cf. Examples A–5 and A–6). In the examples and controls herein set forth, a larger than minimum quantity of catalyst was employed to expedite the conversion. DSV values as low as 5.7 were obtained for polybutadiene, and since the DSV is essentially a logarithmic value, the radical improvement effected by the present invention will readily be appreciated. Since the butadiene-styrene copolymers produced by alfin polymerizations have somewhat lower DSV values, the present invention can produce even lower DSV values for such copolymers.

*Oil extending procedures*

For compounding the control and regulated polymers produced by organo-alkali metal solid catalysis, after determining the weight of the swollen polymer produced by a given number of bottles, say 10, which polymer was first blended in the grinder, the percent conversion was of the table presents the control B-1 for the examples of that section; and Examples B-2 and B-3 further illustrate one of said modes of practicing the invention.

TABLE I.—INFLUENCE OF ADDITIVES AS REGULATORS, ON ORGANO-ALKALI METAL SOLID CATALYST MASS POLYMERIZATION OF DIENES (BUTADIENE) IN SOLVENT

[Each example run in three vessels using catalyst prepared by procedure 1, with product blended therefrom]

| Example Number | Charged Per Vessel | | | | Conv. | | DSV | See Footnotes |
|---|---|---|---|---|---|---|---|---|
| | Pentane (ml.) | Catalyst (ml.) | Butadiene (g.) | Additive (amount) | Min. | Percent | | |
| A-1 | 350 | 75 | 70 | None (control) | 30 | 84 | 12.9 | |
| A-2 | 350 | 75 | 70 | Lauryl mercaptan, 0.4 ml | 30 | 72 | 12.9 | (3) |
| A-3 | 350 | 75 | 70 | RPA #3,[1] 0.5 ml. (35% sol.) | 30 | 80 | 15.8 | (3) |
| A-4 | 350 | 75 | 70 | t-Dodecyl mercaptan, 0.2 ml | 30 | 83 | 11.1 | (1) |
| A-5 | 350 | 75 | 70 | t-Dodecyl mercaptan, 0.2 ml | 30 | 82 | 9.2 | (2) |
| A-6 | 350 | 75 | 70 | Halowax 1031,[2] 0.1 ml | 30 | 49 | 5.7 | (3) |
| A-7 | 350 | 75 | 70 | Halowax 1031,[2] 0.05 ml | 30 | 61 | 7.0 | (3) |
| A-8 | 350 | 75 | 70 | Bromobenzene, 0.1 ml | 30 | 57 | 6.9 | (3) |
| A-9 | 350 | 75 | 70 | Benzene plus benzylchloride, 1.0 and 0.01 ml | 30 | 67 | 6.8 | (3) |
| B-1 | 400 | 75 | 70 | None (control) | 30 | 73 | 11.5 | |
| B-2 | 400 | 75 | 700 | t-Dodecyl mercaptan, 0.2 ml | 30 | 74 | 8.5 | (3) |
| B-3 | 400 | 75 | 700 | Benzyl chloride, 0.05 ml | 150 | 42 | 6.5 | (3) |

[1] Mixed xylene thiols from E. I. du Pont de Nemours & Co.
[2] Mono-chloronaphthalene, 95%, from Halowax Div. of Bakelite Co.
(1) t-Dodecyl mercaptan added to the catalyst, was consumed by part of the catalyst present.
(2) t-Dodecyl mercaptan added with the butadiene uniformly.
(3) Additive added immediately following charging of monomer to catalyst.

determined by drying an aliquot portion thereof, thus determining the dry weight of the remaining swollen polymer, which was placed in a large jar, just covered with solvent containing the quantity of oil extender desired to be incorporated into the dry polymer, and the jar was closed. When the contents of the jar appeared homogenous (after 24 hours) the mixture was again passed through the grinder and the solvents were removed, herein by steam distillation. The resulting oil extended dry polymer was then ready for compounding to evaluate the physical properties of its vulcanizate.

Turning now to the specific examples illustrating the present invention, Table I, Section A, presents the control A-1 for the examples of that section. Examples A-2 and A-3 (compare Examples C-2 and C-3) illustrate that regulators reacting too rapidly with the solid catalyst should not be added before polymerization is manifest, and Example A-4 shows that the new result is not fully realized, without employing the special conditions provided by the present invention, while Examples A-5 to A-9 illustrate the beneficial effect of two of the modes of practicing the present invention. Section B Table II, Section C, presents the control C-1 and Examples C-2 through C-6 showing the benefits of practicing the present invention with addition of the regulator proportionately with the monomers, but only after pre-initiation of polymerization of monomers in absence of the regulator to form polymer in the vicinity of the solid catalyst particles for resisting diffusion of regulator into contact with the solid catalyst and thus protecting the initiating solid catalyst from reacting with the regulator; while in Section D the table presents the control D-1 and Examples D-2 to D-5 further illustrating this mode of practicing the invention, and comparative Example D-6 showing a nitroaryl material that is not effective for the purposes of the present invention.

Table III summarizes by typical examples, corresponding to Examples B-1 (control) and B-3 of Table I, the improved nature of the regulated organo-alkali metal solid catalyst produced polymer as regards compounding for vulcanization, and compares the physical properties of the vulcanizates of such typical control and regulated polymer.

TABLE II.—INFLUENCE OF ADDITIVES AS REGULATORS ON ORGANO-ALKALI METAL SOLID CATALYST PRE-INITIATED [1] MASS POLYMERIZATION OF DIENES (BUTADIENE) IN SOLVENT

[Each example run in three vessels using catalyst prepared by procedure 1 with product therefrom blended]

| Ex. No. | Charged Per Vessel [1] | | | | Conv. | | DSV |
|---|---|---|---|---|---|---|---|
| | Pentane, ml. | Catalyst, ml. | BD, g. | Additive, ml. | Min. | Percent | |
| C-1 | 350 | 75 | 7+70 | None (control) | 30 | 75.4 | 12.2 |
| C-2 | 350 | 75 | 7+70 | Lauryl mercaptan, 0.2 | 30 | 69.5 | 10.5 |
| C-3 | 350 | 75 | 7+70 | RPA #3,[2] 0.5 (35% sol.) | 30 | 71.5 | 9.9 |
| C-4 | 350 | 75 | 7+70 | Carbon tetrachloride, 0.1 | 30 | 15.1 | 5.9 |
| C-5 | 350 | 75 | 7+70 | Allyl chloride, 0.05 | 30 | 63.6 | 10.3 |
| C-6 | 350 | 75 | 7+70 | n-Octaldecyl chloride, 0.2 | 30 | 62.8 | 10.5 |
| D-1 | 350 | 75 | 7+70 | None (control) | 30 | 72.4 | 11.0 |
| D-2 | 350 | 75 | 7+70 | t-Butyl chloride, 0.05 | 30 | 56.0 | 8.7 |
| D-3 | 350 | 75 | 7+70 | Cyclohexyl chloride, 0.05 | 30 | 49.5 | 7.2 |
| D-4 | 350 | 75 | 7+70 | Di-t-butyl peroxide, 0.2 | 30 | 55.0 | 10.0 |
| D-5 | 350 | 75 | 7+70 | Methylene chloride, 0.05 | 30 | 27.2 | 8.5 |
| D-6 | 350 | 75 | 7+70 | Nitrobenzene, 0.2 | 30 | 35.4 | 12.7 |

[1] The 7 grams of butadiene, free of additive, was charged into the solvent-catalyst suspension comprising 350 ml. pentane and 75 ml. catalyst suspension. The 70 grams of butadiene containing the additive was charged about 0.5 minutes after polymerization of the 7 grams of butadiene had been initiated.
[2] See Example A-3.

TABLE III.—EXTENDING, COMPOUNDING AND PHYSICAL PROPERTIES OF THE VULCANIZATES OF POLYBUTADIENE PREPARED BY ORGANO-ALKALI METAL SOLID CATALYST IN THE PRESENCE OF t-DODECYLMERCAPTAN AS CHAIN TRANSFER AGENT

|  | Typical Example | Control |
|---|---|---|
| Polymer from Example | B-3 | B-1 |
| Amount (wt., parts) | 100 | 100 |
| Oil Extending (by swelling) Dutrex 20 [1] (wt., parts) | 60 | 137.5 |
| Compounding: |  |  |
| AgeRite Resin D [2] | 1 | 1 |
| Stearic Acid | 1 | 1 |
| Zinc oxide | 3 | 3 |
| Altax [3] | 1.5 | 1.5 |
| Philblack "O" [4] | 50 | 50 |
| Sulfur | 1.5 | 1.5 |
| Time working on mill (min.) | 10 | 20 |
| Behavior of extended polymer on mill | ([5]) | ([6]) |
| Compound Mooney Viscosity (ML-4) | 106 | Sheared |
| Curing: Optimum cure, min. at 285° F | 30 | 90 |
| Physical Properties: |  |  |
| Tensile strength, p.s.i. | 2,800 | 2,400 |
| Elongation, percent | 325 | 415 |
| 300% Modulus, p.s.i. | 2,510 | 1,630 |
| Shore A Durometer | 69 | 62 |

[1] Aromatic hydrocarbon (oil), "Compounding Ingredients for Rubber" (2nd Edition), India Rubber World, page 196.
[2] Polymerized trimethyl dihydroquinoline, ibid., p. 148.
[3] Benzothiazyl disulfide, ibid., p. 85.
[4] High abrasion furnace (HAF) black, produced by Phillips Petroleum Company.
[5] Good sheet.
[6] Sticky and pulls apart.

With dilute solution viscosities (DSV) between 10 and 15 or more polymers are not rapidly processible on a mill and not as readily millable with oil extenders to render them processible on the mill, without extreme long hold-up for swelling or extreme long working to break down the molecular weight of the polymer (see Table III control). Two methods are available for incorporating oil extender: (1) mill addition, and (2) swelling the polymer with oil in solvent. The first method, with a polymer of 10–15 or more DSV may require as much as two hours or more depending upon the amount of residual solvent in the polymer and the breakdown of molecular weight produced gives poor physical properties to the vulcanizates. The second method requires a swelling time of several days and use of additional solvents that must be later removed, and produces a sticky polymer requiring much longer time for working in of compounding ingredients than a well sheeted polymer.

With dilute solution viscosities below 10 the above objections are largely obviated and the polymers are readily procesible on a mill (see typical example, Table III).

In Table I, the control, Example A-1, shows a DSV above 10, and comparison Examples A-2 and A-3 show that under the conditions of polymerization in these examples (in which the very active regulator was not sufficiently protected from reaction with the catalyst) no significant regulation was achieved with the mixed xylene thiols and the primary lauryl mercaptan. Also with tertiary-dodecyl mercaptan mixed with the catalyst before adding butadiene (comparison Example A-4), only slight regulation was accomplished, probably because of reaction of the mercaptan with the catalyst itself, which was present in excess.

In Example A-5, however, in which the same mercaptan was mixed with the butadiene before adding to the catalyst in accordance with one of the protective procedures of this invention, a significant modification was achieved, and the polymer of DSV 9.2 was readily processible and readily extended. And in Examples A-6 to A-9 employing mono-chloronaphthalene, bromobenzene and benzene plus benzyl chloride as regulators, even lower DSV values were achieved under the protective procedure employed therein, even though that procedure was not sufficient to protect the regulator employed in Examples A-2 and A-3.

Examples B-2 and B-3 further illustrates the highly advantageous results from the use of small quantities of mercaptan and aralkyl halide under the same protective procedure. Example B-2 is taken as the typical example of Table III, since its DSV lies at 8.5 near the middle of the range of improvement achieved by the present invention, and since its control lies at 11.5 which is in the lower region of the DSV range ordinarily produced by conventional organo-alkali metal catalyzed polymerizations.

It will also be noted that the DSV values of the polymers produced by organo-alkali metal polymerization, whether with or without the improvement effected by the invention, are substantially independent of the percentage conversion and of the amount of catalyst concerned (see Whitby, ibid., p. 749 and compare Examples B-3 and A-9 and Examples A-6 and A-7).

Examples C-1 and C-6 and D-5 show a marked reduction of DSV value with various regulators and show little reduction in yield when the regulating is practiced under the preferred protective procedure, except in the case of Examples C-4 and D-5 in which the highly active chloromethane derivatives, in the quantities used, obviously reacted with and deactivated catalyst. Example D-5 by comparison with Examples C-4 shows that by reducing the quantities of these active materials deactivation of catalyst is reduced, and as the DSV is dependent of the percentage conversion in these systems, indicates that successful regulation by chain transfer can be obtained without excessive deactivation of catalyst by use of say 0.01 part of these active materials (compare Example A-9) and more extensive pre-initiation of polymerization before their addition.

As heretofore practiced, sodium mass polymerization and emulsion polymerization yield polymers with DSV values of less than 5, while heterogeneous organo-metallic catalyzed polymerizations, including alfin polymerizations, yield polymers with DSV values of more than 10, leaving a great hiatus between the two. The present invention makes polymers directly available having values in the range between 5 and 10 in which a better balance between toughness, workability, and other physical and practical properties is obtained.

*Further examples*

As indicated above, regulators according to the present invention may be employed to control the molecular weight of polymers formed from various monomer materials and with various solid catalyst systems. As examples may be cited the regulation of: the solid catalyst polymerization of an olefin such as ethylene, the solid catalyst polymerization of dienes, and the organo-metallic organo-alkali metal solid catalyst polymerization of copolymers of unsaturated hydrocarbons.

*Example E-1.*—It is known that ethylene may be polymerized in liquid phase in a non-aqueous system with organo-alkali metal catalyst systems yielding high polymers difficult to mold. (See Thos. Boyd U.S. Patent No. 2,606,179, dated Aug. 5, 1952). Such polymerizations may be regulated to produce lower molecular weight polymers by addition of the regulators of this invention in the manners above set forth.

*Example E-2.*—As an additional example may be also cited the polymerization of ethylene with solid catalyst systems other than those employing organo-alkali metal solid catalysts, of which a solid catalyst prepared from triethylaluminum and titanium tetrachloride may be taken as typical.

As control, ethylene was polymerized by passing the gas at between 40 and 60° C. into a stirred suspension of 200 ml. of the solid catalyst suspension of procedure 4 further diluted with one liter of decane.

To demonstrate the regulation of the polymerization the same procedure was repeated but with ethylene gas saturated at −20° C. with bromobenzene. Thus a calculated 0.2 gram of the aryl halide was supplied protected from reaction with the catalyst system by dilution with 100 grams of the monomer. The same amount of polymer was obtained as in the case of the control.

The evaluation of the polymers showed that the regulated polymer had a temperature of plastic flow 30° C. lower than that of the control and was more easily extruded and molded.

*Examples E–3 and E–4.*—Comparable results are obtained when polyethylene and regulated polyethylene are prepared with similar solid catalyst systems derived from the trimethyl aluminum etherate and triallyl aluminum etherate instead of triethyl aluminum etherate.

*Example F–1.*—It is known that triethyl aluminum-titanium tetrachloride solid catalysts prepared as in procedure 4 above are not suitable for the polymerization of butadiene, but that solid catalysts with augmented insoluble substrate prepared as in procedure 7 or 8 are capable of rapidly polymerizing butadiene to high molecular weight, producing polymers that are workable only with difficulty. By the application of the present invention to such polymerization—especially with the charging of a part of the diene monomers in absence of the polymerization regulator to create polymer to protect the regulator from reacting with the solid catalyst and to enable it to operate as a polymer growth control agent—and by adjusting the quantity of regulator used, the molecular weight of the so-produced diene polymers may be substantially controlled.

*Example G–1.*—Example E–1 and Tables I and III employ the same metal-organic heterogeneous solid catalyst systems to polymerize an olefin and a diene and show that the regulators of this invention effect molecular weight control in both instances. In similar manner, regulated high copolymers of olefin and diene components of which an ethylene-butadiene copolymer may be taken as typical, are produced by use of the regulators and protective procedures above set forth.

*Example G–2.*—Similarly, Example F–1 shows that the same solid catalyst composition that is effective for the polymerization of olefins to high molecular weight is with augmented substrate, applicable for the polymerization of dienes to high molecular weight. Thus, copolymers of olefin and diene of regulated molecular weight may be produced by polymerization by the method of Example F–1 using the regulators and protective procedure herein disclosed.

*Example H–1.*—In a copending U.S. patent application by one of the present inventors, Oskar E. H. Klopfer and Oliver W. Burke, Jr., Ser. No. 580,642, filed Apr. 25, 1956, entitled "Conjunctive Polymers, and Methods and Catalyst Systems for the Preparation Thereof," procedures are disclosed and claimed for producing new conjunctive copolymers and the molecular weight of such conjunctive graft copolymers may similarly be controlled by employing the regulators and protective procedures of this present invention.

*Further discussion*

A hypothesis that seems to explain the present invention and the special conditions found necessary to its successful practice is afforded by the following comparisons of peroxide type polymerizations and organo-alkali metal solid catalyst type polymerizations and with solid catalyst type polymerizations in general to which the present invention is applicable.

(1) In peroxide catalyzed polymerizations the polymerization is initiated by the peroxide free radical, creating monomer peroxide free radicals, $RO(Mer)^*$ that grows to be polymer peroxide free radical $RO(Mer)_n^*$. The mercaptan modifier used in such polymerization also reacts with the peroxide catalyst, e.g., ROOR or ROOH, and forms mercaptan free radical, $RS^*$. The mercaptan free radical is then available to terminate the polymer peroxide radical $RO(Mer)_n^*$ and/or to start or to terminate a new mercaptan polymer radical $RS(Mer)_n^*$. The primary and tertiary mercaptans work equally well in such polymerization mechanism, in which the mercaptan reacts with the catalyst to form free radicals.

(2) In contrast to the foregoing, the metal-organic heterogeneous solid catalyst mass polymerization with which the present invention is concerned, the solid catalyst system is of such a nature that if the mercaptan is brought into contact with it the catalyst and mercaptan react to produce a mercaptide and a hydrocarbon, neither of which is a polymerization initiator or terminator. Thus the conversion of the exposed solid catalyst to mercaptide would prevent it from initiating polymerization at all. To practice the present invention therefore, provision must be made to protect the catalyst from the mercaptan or other solid catalyst reactive regulator employer herein, and vice versa, and to this end, in accordance with this invention, the mercaptan is either introduced into the monomer and solvents as a whole, in which the concentration of mercaptan will be very small, or as a preferred procedure a small part, say 10%, of the monomer is brought into contact with the solid catalyst in the absence of the regulator, and then mercaptan regulator is added together with or simultaneously with the remainder of the monomer after some polymer has been formed to impede reaction between the regulator and the solid catalyst. In addition, to prevent the mercaptan from deactivating the solid catalyst before it can substantially initiate polymerization, the mercaptan if included in the monomer from the start must be one that reacts with the catalyst more slowly than the monomer, i.e., a mercaptan in which steric hindrance slows down the reaction rate, e.g., tertiary-mercaptan (see Example A–5) or the conditions must be adjusted to effect these results, e.g., the mercaptan, especially if a primary mercaptan (Examples A–2 and C–2) must be added after part of the monomer has initiated the polymerization (Example C–2).

Under these circumstances, the organo-alkali metal solid catalyst (RNa) can *initiate* the polymerization of the monomer material (Mer), as

$$RNa + (Mer) \rightarrow Na(Mer)^* + R^* \qquad (1)$$
and
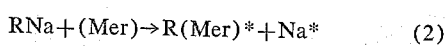
$$RNa + (Mer) \rightarrow R(Mer)^* + Na^* \qquad (2)$$

The growth can then proceed:
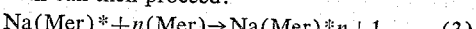
$$Na(Mer)^* + n(Mer) \rightarrow Na(Mer)^*_{n+1} \qquad (3)$$
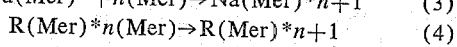
$$R(Mer)^* + n(Mer) \rightarrow R(Mer)^*_{n+1} \qquad (4)$$

(3) The terminating reaction, *without regulator*, may be expressed in part as

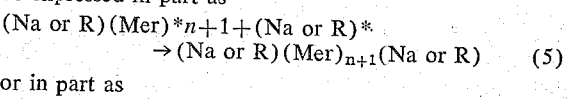
$$(Na \text{ or } R)(Mer)^*_{n+1} + (Na \text{ or } R)^*$$
$$\rightarrow (Na \text{ or } R)(Mer)_{n+1}(Na \text{ or } R) \qquad (5)$$

or in part as

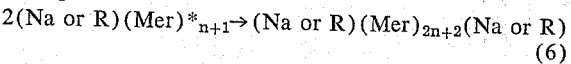
$$2(Na \text{ or } R)(Mer)^*_{n+1} \rightarrow (Na \text{ or } R)(Mer)_{2n+2}(Na \text{ or } R) \qquad (6)$$

In such instance, *without regulator*, since the polymer is growing out of the solid catalyst surface there are not many free radicals to terminate the polymerization according to Equation 5 and it is possible that a large part of such termination is effected by Equation 6, accounting for the extreme high molecular weights obtained in unregulated metal organic heterogeneous solid catalyst polymerization.

(4) In practicing the present invention, however, we distribute in the monomer material (Mer) a minor quantity of a regulator material *ti* that is prevented from contacting the catalyst so that on contact with a growing polymer radical it can terminate the growing chain according to the equation

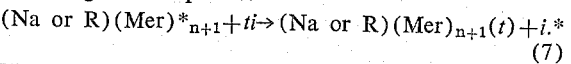
$$(Na \text{ or } R)(Mer)^*_{n+1} + ti \rightarrow (Na \text{ or } R)(Mer)_{n+1}(t) + i.^* \qquad (7)$$

The new free radical $(i)^*$, created by this termination reaction can itself initiate a new polymerization, as $(i)(Mer)^*$, or terminate another chain. The mechanism heretofore set forth is only a hypothesis and if future experimental work shows the mechanism to be otherwise this will in no way detract from the fact that the regulators of this invention do control the molecular weight of polymers produced by the mass polymerization of unsaturated hydrocarbons employing solid catalyst systems.

In the present invention, therefore, the regulator, when a mercaptan, does not react with the solid catalyst as in the case with a mercaptan or halide modifier in a peroxide catalyzed polymerization, but instead can react usefully only with growing polymer chains to effect chain transfer and is reserved to perform such function.

Regulating agents

As just indicated, and as mentioned at the outset, the mercaptans that are usable as regulators in the present invention comprise the primary-, secondary-, and tertiary-mercaptans, including alkyl, alkenyl, aryl, alkaryl, aralkyl, alkaryl, etc., that under the polymerization and concentration conditions must be prevented from reacting with the catalyst, or that react with the solid catalyst destroying such at a rate much more slowly than the solid catalyst polymerizes the monomers. It is more difficult to prevent the primary mercaptans from reacting with the solid catalyst, therefore, the tertiary mercaptans are preferred.

As halide regulators, there may be employed all such halides that are capable of dissociating to yield free radicals such as the alkyl-, alkenyl-, aryl-, alkaryl-, arylakyl- halides and the corresponding polyhalo compounds having molecular weights between 50 and 300.

In addition, certain organic peroxides found to have activity as regulating agents of this invention include dialkyl peroxides, alkyl hydroperoxides, alkyl-aryl and hydro-aromatic peroxides and hydroperoxides and aralkyl-hydroperoxides that are such slow initiators as to be non-useful as catalysts for practical and economical rapid mass polymerization of elastomers, but which are nevertheless effective as chain transfer agents of an already initiated solid catalyst polymerization.

The new polymers which are made available through the new processes described above may be employed for all purposes for which solid, strong plastic and elastomeric materials are known to be useful, e.g., molding, extruding, blowing or other shaping into tubes, rods, films, channels or any other desired shapes. A noteworthy feature of the new polymers is the narrow spectrum of molecular weights of molecules found in any final product. Thus, not only do the new operations permit the molecular weight to be controlled and brought to a much lower level than has been possible with alfin polymerizations heretofore, but also the spread of the molecular weight in the final polymers is very narrow. This results in polymeric products of unique properties. For example, polybutadiene prepared in accordance with the new procedures to have an intrinsic viscosity (DSV value) of between about 2 to 6, has excellent abrasion resistance and low heat build-up on continued flexing so that it is equivalent in performance to natural rubber or synthetic cis-polybutadiene in tire treads, even though the polymer mass contains a large percentage of trans as well as cis-polybutadiene.

Having provided a complete description of the invention in such manner as to distinguish it from other inventions and from what is old and having provided a description of the best mode contemplated of carrying out the invention, the scope of patent protection to be granted the invention is defined by the following claims.

We claim:

1. In the method of polymerizing butadiene with an alfin catalyst under anhydrous conditions to yield polybutadiene having a dilute solution viscosity in the range of about 5 to 10, the improvement which comprises contacting at least a part of the butadiene with the catalyst and thereafter adding tertiary alkyl mercaptan to the polymerization mass whereby the extent of polymerization of the butadiene is regulated by the added mercaptan.

2. The improvement of claim 1 wherein the mercaptan is added immediately after all of the butadiene has been brought in contact with the catalyst.

3. A process for the production of polybutadiene having a dilute solution viscosity in the range of 5 to 10 which comprises providing a metallic heterogeneous catalyst system containing sodium allyl, sodium isopropoxide and sodium chloride, contacting butadiene with said catalyst system under substantially anhydrous polymerization conditions and only thereafter adding an alkyl mercaptan to the polymerization mass in an amount between about 0.05 to 0.2 ml. for each 70 grams of butadiene whereby the rapidity of the polymerization and the extent of polymerization of the butadiene is reduced by the addition of the alkyl mercaptan.

4. A process for the production of hydrocarbon polymers having controlled dilute solution viscosity which comprises providing an alfin catalyst, contacting a polymerizable ethylenically unsaturated hydrocarbon with the catalyst under substantially anhydrous polymerization conditions, and after polymerization has begun, adding in increments to the polymerization mass an alkyl mercaptan, the amount of the mercaptan added being controlled to create a regulated dilute solution viscosity in the final hydrocarbon.

5. The process of claim 4 wherein said alkyl mercaptan is a tertiary alkyl mercaptan.

6. A process for the production of polybutadiene having a dilute solution viscosity in the range of 5 to 10 which comprises forming a polymerization medium consisting essentially of a catalyst suspension consisting of allyl sodium, sodium isopropoxide and sodium chloride in the mole proportion of 1:1:2 in pentane, the polymerization medium having been prepared by adding to 400 parts by volume of pentane, 75 parts by volume of catalyst suspension formed by reaction in pentane of sodium metal, amyl chloride and diisopropyl ether using in the preparation with each one mole of sodium metal, two moles of amyl chloride and one mol of diisopropyl ether, charging butadiene into said polymerization medium in a proportion of 700 grams of butadiene for each 400 ml. of pentane and 75 ml. of said catalyst suspension in said polymerization medium, immediately after charging of the butadiene adding t-dodecyl mercaptan to the polymerization medium in the proportion of 0.2 ml. of the mercaptan to each 700 grams of butadiene, allowing the resulting polymerization reaction to proceed for about one-half hour, stopping the polymerization by adding isopropanol to the polymerization mass and finally recovering from the polymerization mass polybutadiene having a dilute solution viscosity in the range of 5 to 10.

References Cited by the Examiner

UNITED STATES PATENTS

| | | | |
|---|---|---|---|
| 2,234,204 | 3/1941 | Starkweather et al. | 260—82.1 |
| 2,739,138 | 3/1956 | Kharasch et al. | 260—84.3 |
| 2,797,208 | 6/1957 | Burke | 260—94.2 |
| 2,832,759 | 4/1958 | Nowlin et al. | 260—94.2 |
| 2,841,574 | 7/1958 | Foster | 260—94.2 |
| 2,843,577 | 7/1958 | Friedlander et al. | 260—94.9 |
| 2,886,561 | 5/1959 | Reynolds et al. | 260—94.9 |
| 2,913,446 | 11/1959 | Cull et al. | 260—94.9 |
| 2,996,459 | 8/1961 | Andersen et al. | 260—94.2 |
| 3,072,630 | 1/1963 | De Jong et al. | 260—94.9 |

FOREIGN PATENTS 570,199   2/1959   Belgium.

JOSEPH L. SCHOFER, Primary Examiner.

M. LIEBMAN, JAMES A. SEIDLECK, LEON J. BERCOVITZ, Examiners.

E. L. ROBERTS, H. I. CANTOR, C. R. REAP,
*Assistant Examiners.*